Patented Jan. 13, 1931

1,788,772

UNITED STATES PATENT OFFICE

HOWARD W. MATHESON, OF MONTREAL, QUEBEC, AND FREDERICK W. SKIRROW, OF SHAWINIGAN FALLS, QUEBEC, CANADA, ASSIGNORS TO CANADIAN ELECTRO PRODUCTS COMPANY, LIMITED, OF MONTREAL, QUEBEC, CANADA

CONDENSATION PRODUCT AND METHOD OF MAKING THE SAME

No Drawing.  Application filed February 25, 1922. Serial No. 539,296.

This invention relates to materials of resinous character and to the manufacture thereof, and has particular reference to so-called synthetic resins specially adapted for moulding and casting purposes, and for the manufacture of varnish, lacquer and the like, the material being capable of being utilized in either liquid or solid form, which material when properly subjected to the action of heat or heat and pressure, with or without added hardening or accelerating agents, undergoes chemical reaction and assumes a hard set and infusible and insoluble form.

The main object of the invention is the production of a hard infusible and insoluble resinous material by reacting with an aldehyde, aldehydic body or body capable in the reaction of liberating an aldehyde, in presence of a catalyst, on a product resulting from the interaction of acetylene and a phenol, and hardening the mass by heat or heat and pressure with or without addition of a hardening agent.

A further object is the production of a solid but infusible and soluble potentially reactive aldehyde reaction product which can be pulverized for use alone or admixed with fillers, colouring agents, hardening agents and the like, as a moulding powder, which is capable of conversion to hard infusible and/or insoluble form by the application of heat or heat and pressure.

Another object is the production of a potentially reactive aldehyde reaction product adapted for solution with or without added hardening agents in suitable solvents for use in impregnating materials for use as a varnish, lacquer or the like, the said product being capable, after removal of the solvent, of conversion to hard infusible and/or insoluble form by the application of heat or heat and pressure.

Other objects and advantages may be ascertained from the following detailed description.

It is known from Patent No. 1,707,940, filed July 25, 1921, that in presence of sulphuric acid and a mercury compound as catalyst, acetylene will react with phenols to produce a fusible and soluble resinous mass which under proper conditions may be hardened to infusibility and insolubility by heat or heat and pressure. The unhardened resinous material we hereafter term, for convenience, primary resin.

We have discovered that a superior resin may be made by reacting on a primary resin, as above, with an aldehyde, preferably acetaldehyde or a polymer thereof, the sulphuric acid group free or combined remaining in the primary resin serving to catalyse the aldehyde reaction. Should the acidic group be removed or neutralized in the primary resinous body, a fresh catalytic body must be added. The characteristics of the resulting product, hereafter, for convenience, termed an intermediate resin, may be greatly diversified by varying the amount of aldehyde and the time and temperature of the reaction. The product may be hardened to infusibility and insolubility merely by heat and pressure or by the addition of a hardening agent and subsequent heat and pressure treatment. The intermediate product may be fused or powdered, according to its nature, for admixture with fillers, colouring agents, hardening agents and the like or for moulding and may be dissolved in suitable solvents, with or without hardening agents, for impregnating material or for use as a varnish and may, after removal of the solvent be hardened to infusibility and insolubility by heat or heat and pressure.

To enable a more thorough understanding of our invention and of some of the variations of which it is capable, reference is made to the following examples in which the primary resin referred to is derived from the reaction of approximately 13.8 parts (by weight) of acetylene on 100 parts of phenol ($C_6H_5OH$) at a temperature between 90° C. and 110° C. in presence of 2.5 parts mercuric sulphate and 1 part sulphuric acid as catalyst.

The primary resin may be first treated for removal of mercury compounds but this is not absolutely necessary unless the final product is to have high dielectric strength.

Also it may be treated for the removal of any excess phenol.

Example I

Approximately 13.8 parts (by weight) of acetylene are absorbed and the material formed in the reaction vessel is a heavy liquid which on cooling becomes solid or semi-solid. This is one form of the primary resin heretofore mentioned and is a fusible and soluble body.

The material may be now treated for separation of mercury compounds, either by settling, centrifuging, filtration or other means; although this step is not essential except where the finished product is intended for purposes requiring high dielectric strength.

One hundred (100) parts of the primary acetylene resin already described is mixed with thirty-five (35) parts of paraldehyde, the resin being first warmed to, say, 50° C. to render it more fluid and miscible, and the whole agitated for ten to fifteen minutes or until homogeneous. On the addition of the cold paraldehyde the temperature at first drops to about 35° C.; then a strong reaction sets in and external or other effective cooling is necessary, also vigorous stirring, to prevent the temperature rising too high and the reaction getting beyond control. Preferably the temperature is maintained between 35° and 50° C. until the initial vigorous reaction subsides, the time varying from fifteen to sixty minutes (approximately). The resulting product, which is one form of intermediate resin, is a heavy liquid which, however, can be readily poured and is convertible to a fusible and soluble or infusible and insoluble solid.

The material may now be poured into a mould and placed at once in an autoclave and the pressure raised to 60 to 200 lbs. per sq. in. and the temperature to about 100° C. during approximately one (1) hour. High temperatures may be used with good results. At the end of this period the material will be found to have been converted into an extremely hard, elastic, infusible and insoluble resin of a rich brown color and that it has taken the form of the mould with exactitude and without loss of weight. Experiments have shown that a freshly made intermediate resin may be hardened at somewhat lower temperatures.

Example II

The process is carried out as detailed in Example I except that instead of thirty-five (35) parts of paraldehyde to one hundred (100) parts primary resin, the amount is increased to fifty-five (55) parts of paraldehyde. The resulting intermediate resin is adapted for pouring into moulds. Practically the same results are obtained after the heat and pressure treatment, in that the material has properties similar to those of the final resin produced according to the first example.

Example III

The process is carried out as in Example I except that instead of thirty-five (35) parts of paraldehyde to one hundred (100) parts primary resin, the amount is increased to seventy (70) parts of paraldehyde. The material sets on final treatment to a hard, insoluble and infusible resin. This product is quite suitable for certain purposes although it does not possess the same degree of strength as the product produced according to Example I.

The liquid material first formed in the foregoing examples is the product of an incomplete reaction, which product, under heat and pressure and by the action of the acidic catalyst in the primary resin, is fully combined. This completion of the reaction in a mould is possible owing to the fact that substantially no water is liberated during the reaction.

It is to be noted that the infusible final product of these three examples resulting from the treatment of a liquid intermediate product may be obtained without the use of added hardening agents and that the property of infusibility is obtained by the heat and pressure treatment. In the following example it will be shown how a solid intermediate resin, which is fusible and soluble, may be produced. Such a resin may be hardened to infusible insoluble form either with or without the addition of hardening agents as will be later explained

Example IV

One hundred parts (100) of the primary resin is warmed to about 50° C. to render it more fluid. Thirty-five (35) parts of paraldehyde (the same amount as in Example I) is added and the whole thoroughly agitated until a homogeneous mixture results. On first adding the cold paraldehyde, the temperature falls to about 35° C. as previously, but after a few minutes it commences to rise rapidly owing to the heat of reaction. The mixture is suitably cooled to keep the temperature preferably between 35° and 50° C. and the whole mass agitated. In about fifteen to sixty minutes the initial vigorous reaction is over and the material is now maintained at approximately 50° with or without agitation for a period of one to two hours. The product on cooling to ordinary temperature sets to a solid brittle mass with a relatively low softening point being approximately 20° C. to 25° C. The material is both fusible and soluble and may be ground to a fine powder.

The solid intermediate resin obtained as outlined above still contains small amounts of aldehyde, aldehydic bodies, or these materials in loosely combined form. If this material is utilized in this form for the manufacture of a moulding powder, the material on subjection to heat and pressure in a mould under the usual moulding conditions is apt to blister. It is therefore preferable to subject the material to a seasoning operation during which seasoning period the complete combination is effected without any detrimental effect on the material insofar as its capability of becoming insoluble is concerned, provided the seasoning temperature is maintained within certain limits. The unseasoned material may be utilized for the manufacture of a moulding powder with fair results. The material for commercially practicable results is preferably seasoned. There is practically no loss in weight during the seasoning process.

*Example V*

A mixture as in Example IV, after subsidence of initial reaction, is maintained between 35° C. and 40° C. for six hours and the product has a softening point about 25° C.

*Example VI*

The product of Example V having a softening point of 25° C. is held at about 35° C. for seven days and the softening point will be found to have risen to about 70° C.

The solid intermediate resins from Examples IV to VI inclusive may be hardened to infusible, insoluble form merely by the application of heat and pressure. In commercial application it may be found desirable to add a hardening agent. The hardening agent—for instance hexamethylenetetramine—is thoroughly mixed with the fusible resin. The admixture may be made by the use of a common solvent which is later removed, or by any suitable mechanical means. The mixture if first warmed softens to plastic condition and then on the application of further heat and pressure it assumes the properties of hardness and infusibility and if originally comminuted loses its former granular or pulverulent form entirely, becoming an amorphous mass. The temperature used when working without added hardening agents is preferably approximately 100° C. during approximately three to five minutes or upwards according to the thickness of the mass, although lower temperatures may be used if the heating period is slightly prolonged. Higher temperatures may also be used for quicker results, or when working with added hardening agents.

In the foregoing examples the amount of paraldehyde has been 35% or over of the amount of primary resin. Less than 35% may be used with good results but if the amount is under 25% the use of a hardening agent is desirable in order to acquire infusibility and insolubility. If the amount is 20% or under the use of such a hardening agent becomes necessary.

The acidic body remaining, either free or combined in the primary resin serves also to catalyze the reaction of the primary resin with paraldehyde and the temperatures and time of the reaction depend on the amount of catalyst. If there is not sufficient catalytic agent present it may be necessary to add more and conversely, some of the acidic body may be removed if the paraldehyde reaction is more vigorous than desired.

The invention may be employed commercially in a great variety of ways, of which only a few can be indicated within the scope of a patent specification.

The intermediate resins which result when working as detailed in Examples I, II or III are suitable for casting or die casting and may be used for making a great variety of novelties and useful articles, also blanks designed to be machined into billiard balls, etc., and further may be cast into sheets, blocks, rods, tubes, and the like for the manufacture of a multitude of articles, such as fountain pen parts, cigar and cigarette holders, pipe stems, hair combs and ornaments, beads and buttons, handles for cutlery, electric insulators, etc.—all of which, of course, may also be cast to finished form.

The intermediate resins which result from the processes of Examples IV to VI, namely, the solid resin, is, after seasoning, preferably used in the powder form, either alone or mixed with suitable fillers, pigments, dyes or the like, with or without so-called hardeners. The resulting material may be moulded to any desired shape by first warming to soften it, or the material may be ground to any suitable degree of fineness, when it is ready for use as a moulding powder.

Those resins capable of being hardened by heat and pressure can also be hardened by heat alone under suitable conditions, well known in the art of cold moulding. This consists in admixing the resin with fillers and hardening as necessary or desirable, cold pressing and then subjecting the pressed material to the action of heat for a period of time.

Both the liquid and solid intermediate resin may be dissolved, with a hardening agent, in a solvent such as alcohol, and sheets of paper or fabric, masses of fibre such as wood pulp, cotton, leather pulp, asbestos and the like impregnated with the dissolved resin. If the quality of the product desired or the nature of the material permits, the hardening agent may be omitted. When subjected to suitable heat and pressure, after removing the solvent, the resin becomes infusible and insoluble, binding together the material which it impregnates and imparting new qualities thereto. In employing animal or vegetable fillers it is obviously necessary that the temperature of the heat treatment be low enough to avoid destruction or injury of the filler.

It will also be possible to employ the material to form surface coatings on a foundation of cheap material, either by applying the powdered resin, as already described, or by dipping the foundation body into the liquid resin or otherwise applying a coating of resin thereto, or by rolling or otherwise pressing on a thin sheet of the fusible resin. The coated foundation is then subjected to heat and pressure to render the coating infusible and insoluble.

This invention contemplates the employment of any suitable primary resin formed by the direct action of acetylene on a phenolic body such as phenol, cresol, naphthol or admixtures thereof. The invention also contemplates the use of any aldehyde, aldehydic body, derivative of an aldehyde or body capable in the reaction of yielding an aldehyde which will produce a desirable intermediate resin. As the invention is at present practised, the use of paraldehyde, or other acetaldehyde forming body is preferred, but instead of paraldehyde there may be used one or more of the following: crotonaldehyde, formaldehyde, preferably in the form of trioxymethylene or paraformaldehyde; with, of course, heat, pressure and time conditions appropriate for the primary resin, the aldehyde and the desired intermediate or final product. The pressure and temperature under which the components are brought together, as well as the duration of the reaction, can be varied as may be convenient or desirable; also the proportions of the aldehyde to the primary resin may be varied as well as the pressure, heat and time, for convenience or to obtain the desired properties in the finished product.

The intermediate resin may be self-hardening as described under proper conditions of heat or pressure or time or any combination of the three, or if not self-hardening, may be mixed with a hardening agent or accelerator, as may also an intermediate resin capable of self-hardening. While hexamethylenetetramine is the only hardening agent so far specifically mentioned, it must be understood that the invention is not limited to such a hardening agent but contemplates the use of any suitable hardening agent; for example, the following are effective in a greater or lesser degree: a phenylenediamine, aldehyde, ammonia, and ethylidene aniline or other aniline and aldehyde bodies. The aldehydes and hardening agents herein mentioned are only by way of suggestion or example and are not for the purpose of circumscribing the invention.

Therefore, in connection with our invention and the various examples given, and more particularly in connection with the manufacture of resins using aldehydes other than paraldehyde, we wish it to be understood that we do not confine the invention to all or any of the precise proportions or to the details herein set forth by way of illustration, as modifications and variations may be made as conditions require or the same may be deemed desirable.

In the appended claims the term "an aldehyde" must be held to include any suitable aldehyde, aldehydic body, or body capable of yielding an aldehyde; also the term "hardening agent" must be held to include any body suitable for the purpose, even though not specifiically named herein.

While the terms "insoluble" and "infusible" have been used herein as applied to the resin, it must be understood that the resin is not necessarily completely insoluble in all solvents or completely infusible, but that the terms mean merely that the resin is entirely or almost entirely insoluble in all ordinary solvents and substantially infusible so that for practical purposes it may be regarded as insoluble and infusible.

The word "resin" is herein used in a generic sense as including bodies of resinous nature and is not to be construed in any narrow or restricted sense. The word is therefore used, in the terms "primary acetylene resin" or "primary resin" and "intermediate acetylene resin" or "intermediate resin" and in reference to the bodies indicated by these terms, not with any intent to designate as true resins, bodies which may be only partial reaction products or potential resins, but purely for brevity and convenience. It may be stated that the liquid intermediate resins are only partial reaction products.

Having thus described our invention, what we claim is:—

1. A process of making a resinous product which comprises reacting on a fusible and soluble acetylene phenolic resinous body with an aldehyde.

2. A process of making a fusible resinous product which comprises reacting on a fusible and soluble acetylene phenolic resinous body with an aldehyde, and maintaining the temperature below the point at which the product becomes infusible.

3. A process of making a resinous product which comprises reacting on a fusible and soluble acetylene phenolic resinous body with an aldehyde and controlling the temperature to regulate the degree of fusibility or infusibility of the product.

4. A process of making an infusible resinous product which comprises reacting on a fusible and soluble acetylene phenolic resinous body with an aldehyde and heating the resulting product until converted to infusible form.

5. A process of making an infusible resinous product which comprises reacting on a fusible and soluble acetylene phenolic resinous body with an aldehyde, adding a hardening agent and heating the mixture until the desired degree of infusibility is attained.

6. A process of making an infusible resinous product which comprises reacting with an aldehyde on a fusible and soluble acetylene-phenolic resinous body incapable in itself of hardening, adding a hardening agent and heating the mixture under pressure until the desired degree of infusibility is attained.

7. A process of making an infusible resinous product which comprises reacting on a fusible and soluble acetylene-phenolic resinous body with an aldehyde for such period of time and at such temperature that the resulting material is a fusible, comminutable, solid, comminuting the solid and forming the comminuted solid into an integral infusible body by heat and pressure.

8. A process of making an infusible resinous product which comprises reacting on a fusible and soluble acetylene-phenolic resinous body with an aldehyde for such period of time and at such temperature that the resulting material is a fusible, comminutable solid, comminuting the solid, mixing the comminuted solid with a hardening agent, and forming the comminuted solid into an integral infusible body by heat and pressure.

9. A process of making a resinous product which comprises reacting on a phenol with acetylene in presence of a mercury salt and sulphuric acid or its acid salts as catalyst, and then reacting on the resulting mass with an aldehyde in presence of retained acidic catalyst.

10. A process of making a resinous product which comprises reacting on a phenol with acetylene in presence of a catalyst, and then reacting on the resulting mass with an acetaldehyde forming body.

11. A composition of matter resulting from the reaction of an aldehyde and a fusible and soluble acetylene-phenolic resinous body.

12. A composition of matter resulting from the reaction of an aldehyde and a fusible and soluble acetylene-phenolic resinous body heated until it becomes infusible.

13. A composition of matter comprising a hardening agent and the reaction product of a fusible and soluble acetylene-phenolic resinous body and an aldehyde.

14. A composition of matter resulting from the reaction of acetaldehyde and a resin product of acetylene and a phenol.

15. A composition of matter, comprising the material resulting from the reaction of an aldehyde and a resin product of acetylene and a phenol; admixed with a hardening agent.

16. An infusible composition of matter resulting from the reaction of an aldehyde and a resin product of acetylene and a phenol; mixed with a hardening agent and subjected to the action of heat.

17. A composition of matter, comprising the material resulting from the reaction of an aldehyde and a resin product of acetylene and a phenol; admixed with hexamethylenetetramine.

18. An infusible composition of matter resulting from the reaction of an aldehyde and a resin product of acetylene and a phenol; admixed with hexamethylenetetramine and subjected to the action of heat.

19. A composition of matter resulting from the reaction of acetaldehyde with a resin product of a phenol and acetylene.

20. A composition of matter for casting, moulding, surface coating or impregnating material, which comprises a fusible soluble reaction product of paraldehyde and a resin product of acetylene and phenol, the said composition being capable of being diluted by solvents or softened by heat to liquid, semi-liquid or plastic condition for casting, moulding, surface coating or impregnating other material and also capable of being converted by the action of heat or heat and pressure from such softened or liquid condition to a hard, infusible, insoluble solid.

21. A process of making a resinous product, which comprises reacting on a fusible and soluble acetylene-phenolic resinous body with an aldehyde and so controlling the temperature and duration of reaction that incomplete reaction results, producing a body which is fusible at normal temperatures and capable of further reaction at elevated temperatures to a state of infusibility.

22. A process of making a resinous product, which comprises reacting on a fusible and soluble acetylene-phenolic resinous body with an aldehyde and so controlling the temperature and duration of reaction that incomplete reaction results, producing a body which is fusible at normal temperatures and capable of further reaction with an added hardening agent to a state of infusibility.

23. A process of making an acid free resinous product which comprises reacting on a fusible and soluble acetylene-phenolic resinous body with an aldehyde in presence of an acidic catalyst, and heating the product thus obtained with an added hardening agent capable of neutralizing the acidic catalyst.

24. A composition of matter comprising a resinous product fusible at normal temperatures and capable of being hardened at elevated temperatures, being the incomplete reaction product of an aldehyde and an acetylene-phenolic resinous body.

25. A composition of matter comprising a resinous product fusible at normal temperatures and capable of being hardened at elevated temperatures, being the incomplete reaction product of an aldehyde and an acetylene-phenolic resinous body mixed with a hardening agent.

In witness whereof, we have hereunto set our hands.

HOWARD W. MATHESON.
FREDERICK W. SKIRROW.